United States Patent
Miller et al.

(10) Patent No.: US 8,480,393 B2
(45) Date of Patent: Jul. 9, 2013

(54) VACUUM-ASSISTED RESIN TRANSFER MOLDING PROCESS WITH REUSABLE RESIN DISTRIBUTION LINE

(75) Inventors: Alan K. Miller, Santa Cruz, CA (US); Theodore Rosario, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 286 days.

(21) Appl. No.: 13/070,618

(22) Filed: Mar. 24, 2011

(65) Prior Publication Data

US 2011/0169190 A1 Jul. 14, 2011

Related U.S. Application Data

(63) Continuation-in-part of application No. 12/484,779, filed on Jun. 15, 2009, now Pat. No. 8,025,834.

(60) Provisional application No. 61/061,204, filed on Jun. 13, 2008.

(51) Int. Cl.
*B29C 70/48* (2006.01)

(52) U.S. Cl.
USPC ............................................................ 425/447

(58) Field of Classification Search
CPC ........................................................ B29C 70/48
USPC ........................................................... 425/447
See application file for complete search history.

(56) References Cited

U.S. PATENT DOCUMENTS

| | | |
|---|---|---|
| 2,766,160 A | 10/1956 | Bentov |
| 3,033,730 A | 5/1962 | Martin |
| 3,067,803 A | 12/1962 | Fleury |
| 3,130,104 A | 4/1964 | Lewis et al. |
| 3,769,127 A | 10/1973 | Goldsworthy et al. |
| 3,855,031 A | 12/1974 | McNeely et al. |
| 3,975,479 A | 8/1976 | McClean |
| 4,558,971 A | 12/1985 | David |

(Continued)

FOREIGN PATENT DOCUMENTS

| | | |
|---|---|---|
| FR | 707101 | 7/1931 |
| GB | 790639 | 2/1958 |
| GB | 1453936 | 10/1976 |
| WO | 2007003011 A1 | 1/2007 |

OTHER PUBLICATIONS

"Resin Transfer Molding and Structural Reaction Injection Molding", "ASM Handbook—Composites XP002552279", 2001, pp. 492-500, vol. 21, Publisher: ASM International, Published in: US.

(Continued)

*Primary Examiner* — Yogendra Gupta
*Assistant Examiner* — Alison Hindenlang
(74) *Attorney, Agent, or Firm* — Kaplan Breyer Schwarz & Ottesen, LLP

(57) ABSTRACT

A method and apparatus for a reusable resin distribution line for use in conjunction with a resin transfer molding apparatus is disclosed. The apparatus includes a soft tool and a hard tool (i.e., mold). In the illustrative embodiment, two inflatable bladders are disposed on a side of the soft tool, wherein a bridge spans the bladders. The soft tool is coupled to the bridge. When the bladders are inflated, the bridge moves away from the hard tool, drawing the soft tool away from the hard tool in the region between the bladders. This creates a temporary passage or reusable resin distribution line for distributing resin to a reinforcement constituent disposed between the soft tool and the hard tool.

8 Claims, 12 Drawing Sheets

U.S. PATENT DOCUMENTS

| | | | |
|---|---|---|---|
| 4,830,809 | A | 5/1989 | Liebl |
| 6,216,752 | B1 | 4/2001 | Bailey |
| 6,627,142 | B2 | 9/2003 | Slaughter et al. |
| 6,630,095 | B2 | 10/2003 | Slaughter et al. |
| 6,656,411 | B1 | 12/2003 | McClure et al. |
| 6,899,842 | B1 | 5/2005 | Corre et al. |
| 2007/0063393 | A1 | 3/2007 | Vernin et al. |
| 2009/0189320 | A1 | 7/2009 | Bolick et al. |

OTHER PUBLICATIONS

Fregosi, Alberto, "PCT Application No. PCT/US2009/047388 International Preliminary Report on Patentability Oct. 21, 2010",, Publisher: PCT, Published in: PCT.

Fregosi, Alberto, "PCT Application No. PCT/US2009/047388 International Search Report Feb. 15, 2010",, Publisher: PCT, Published in: PCT.

"PCT Application No. PCT/US2009/047388 Partial Search Report Nov. 20, 2009",, Publisher: EPO, Published in: PCT.

Hindenlang, Alison L., "U.S. Appl. No. 12/484,779 Notice of Allowance Jun. 17, 2011",, Publisher: USPTO, Published in: US.

Hindenlang, Alison L., "U.S. Appl. No. 12/484,779 Office Action Jan. 21, 2011",, Publisher: USPTO. Published in: US.

Hindenlang, Alison L., "U.S. Appl. No. 12/484,779 Restriction Requirement Dec. 6, 2010",, Publisher: USPTO, Published in: US.

Hindenlang, Alison L., "U.S. Appl. No. 13/184,745 Office Action Apr. 25, 2012",, Publisher: USPTO, Published in: US.

Hindenlang, Alison L., "U.S. Appl. No. 12/951,239 Office Action Apr. 12, 2012",, Publisher: USPTO, Published in: US.

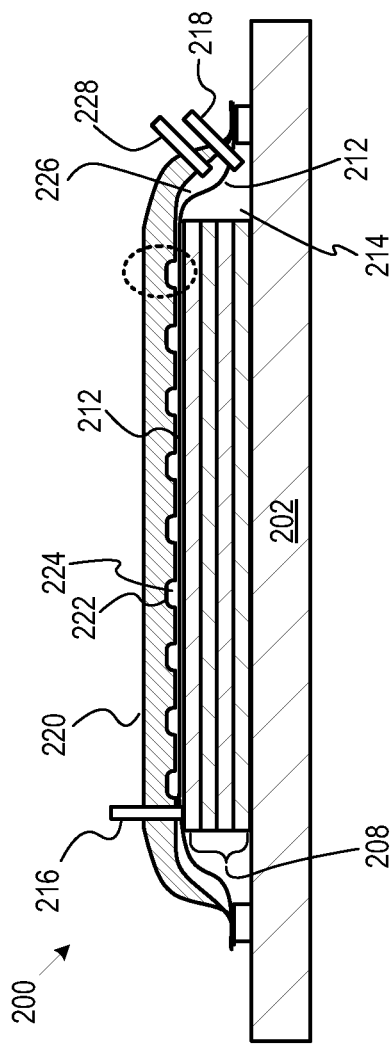
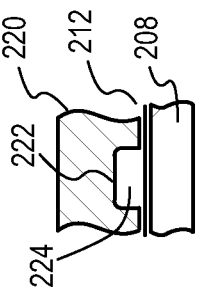
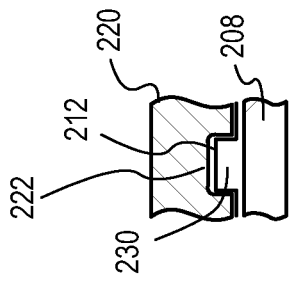
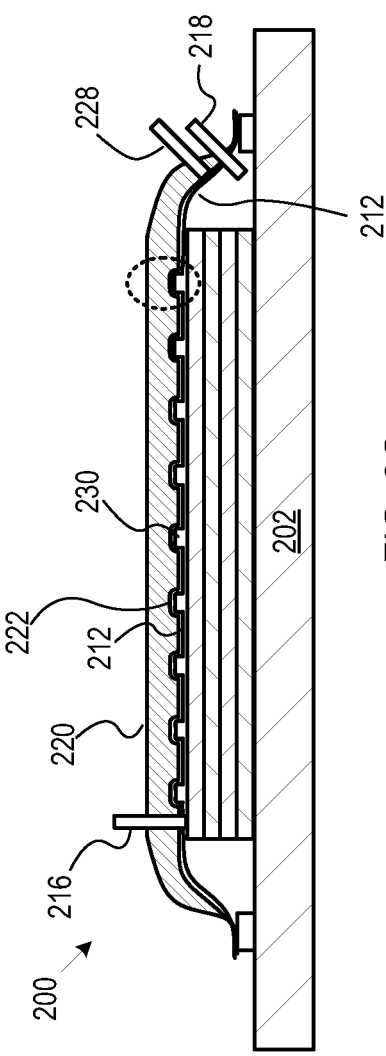

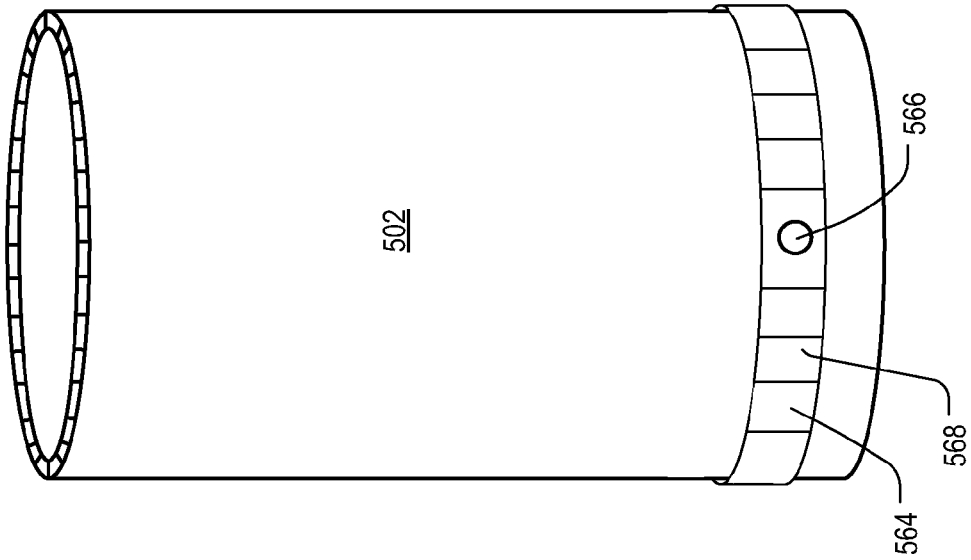
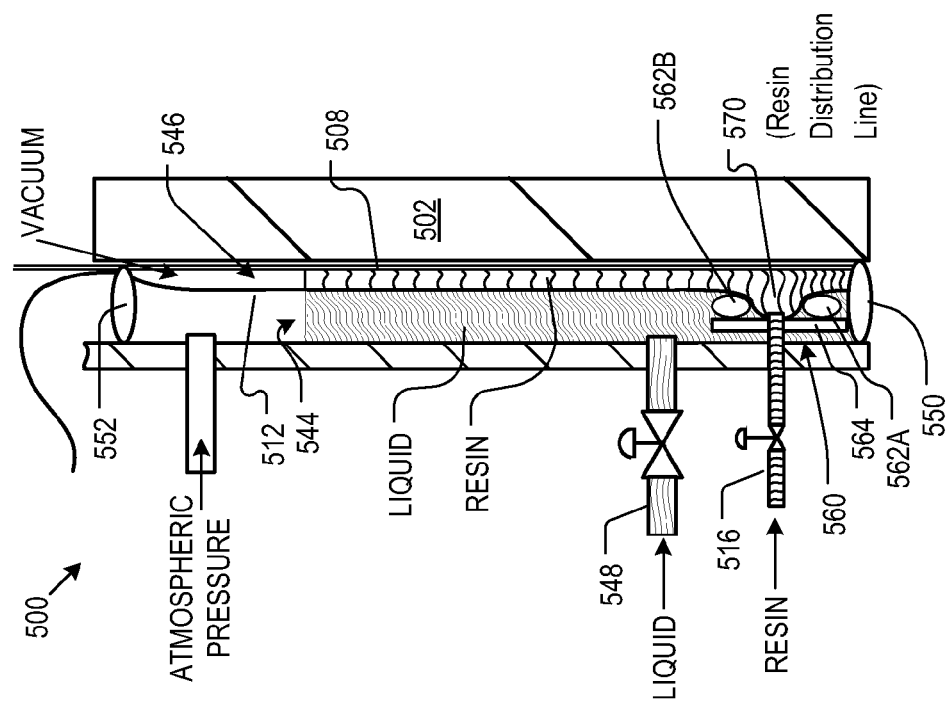

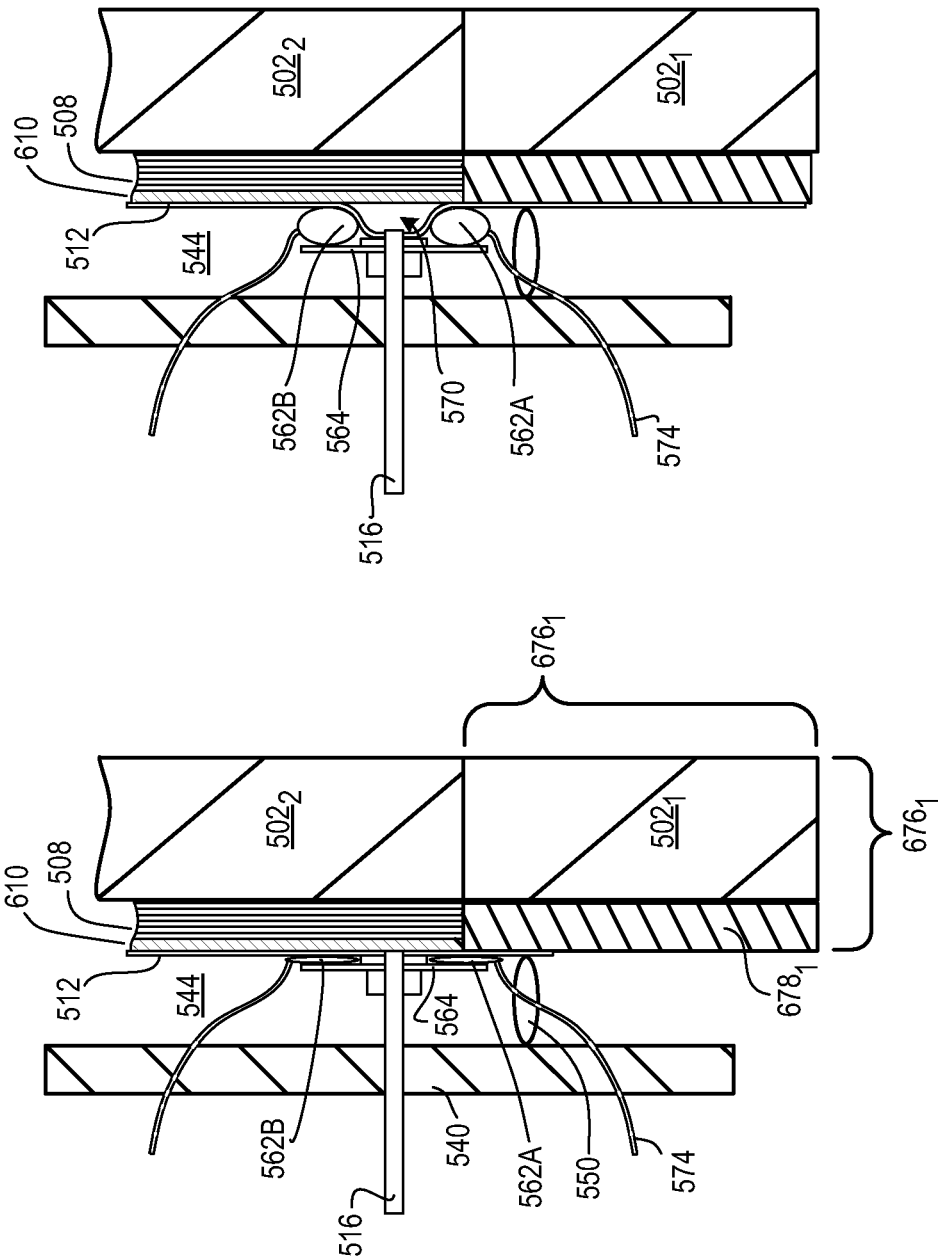

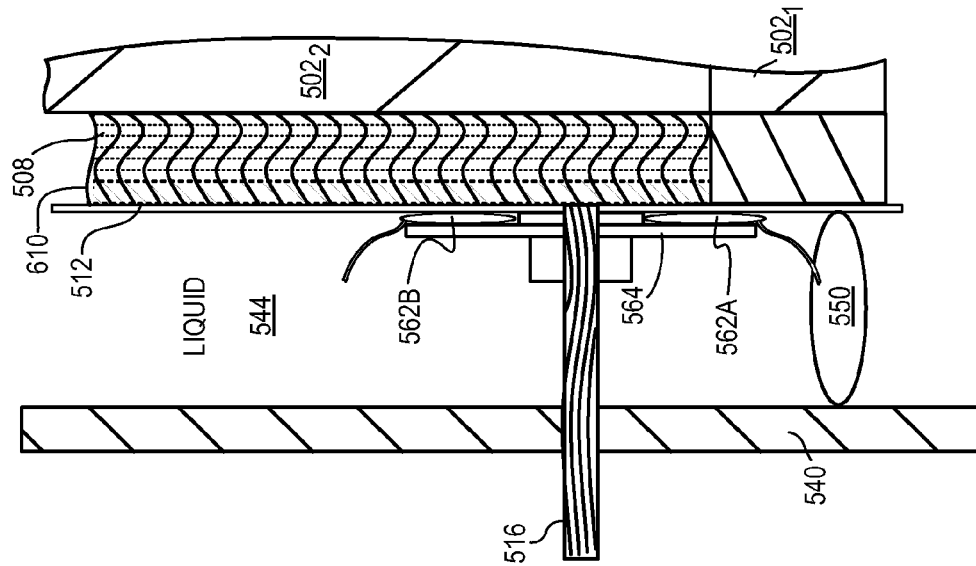
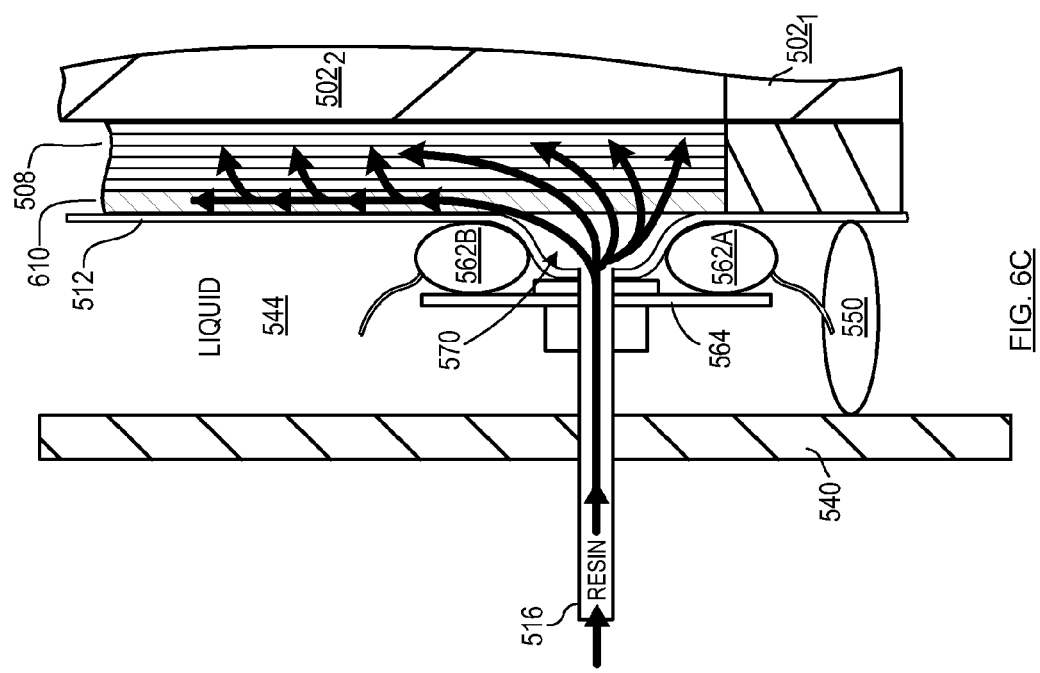

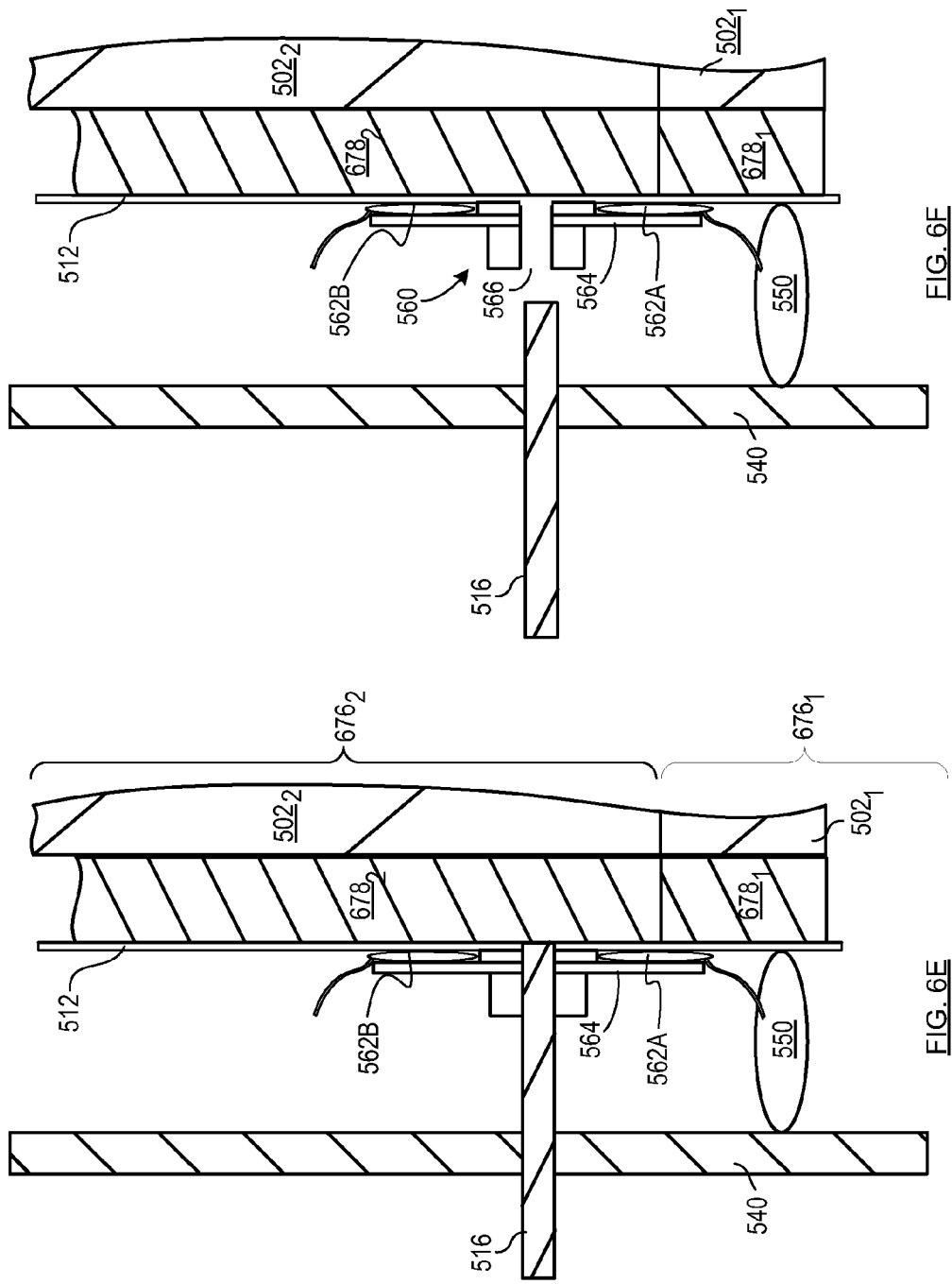

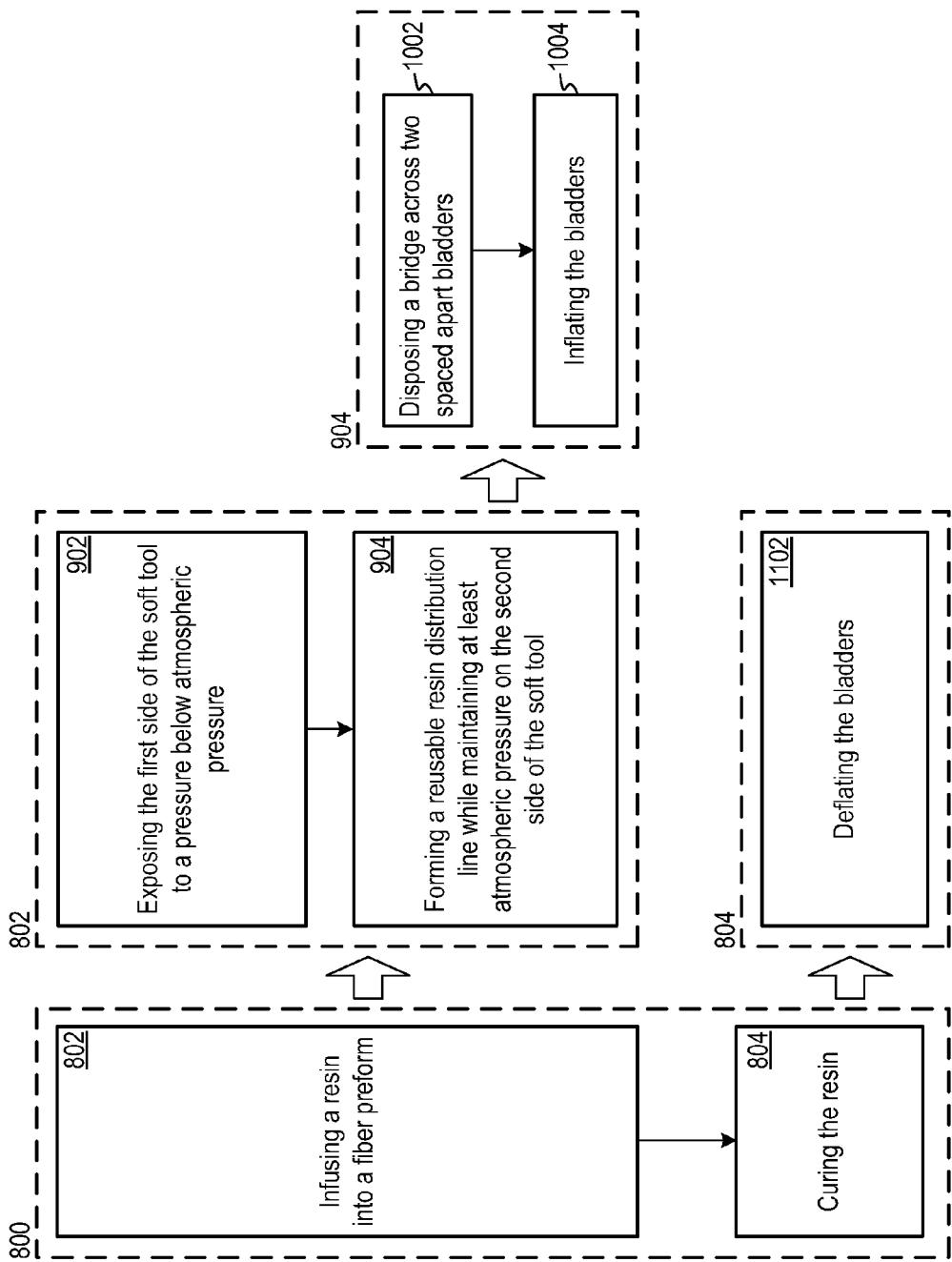

VACUUM-ASSISTED RESIN TRANSFER MOLDING PROCESS WITH REUSABLE RESIN DISTRIBUTION LINE

STATEMENT OF RELATED CASES

This case is a continuation-in-part of U.S. patent application Ser. No. 12/484,779 filed Jun. 15, 2009, which is incorporated herein.

FIELD OF THE INVENTION

The present invention relates to the production of composite materials and structures.

BACKGROUND OF THE INVENTION

Fiber-reinforced polymer-matrix composite materials are used for a variety of structural applications. These composite materials, which include a matrix constituent, typically a resin, and a reinforcement constituent, typically a fiber bundle or woven fabric, are formed via a molding operation.

One method for forming composite materials is a process called "resin transfer molding" or "RTM." In this process, resin is added under pressure into a closed-cavity mold. In the simplest version of RTM, air is left in the fibers before resin injection. Some but not all of this air is driven out through vents as the fibers fill with resin. In order to obtain an acceptable void content in the presence of this residual air, a very high pressure (about 275 psig) is sometimes applied while the resin is curing. The intent of the applied pressure is to shrink the size of any remaining air voids to acceptable levels. This large internal pressure generates substantial forces that tend to push opposing mold surfaces apart. For small molds, this problem is addressed using relatively inexpensive presses. But this approach becomes impractically expensive when dealing with large molds.

Another liquid-resin process is vacuum-assisted resin transfer molding ("VARTM"). In this process, air is driven out of the reinforcement constituent by placing it under vacuum conditions. FIG. 1 depicts a simplified representation of conventional, horizontally oriented, VARTM molding apparatus 100.

As depicted in FIG. 1, apparatus 100 includes hard tool 102 (i.e., the mold) and soft tool 112, which is traditionally implemented as a flexible membrane, such as nylon vacuum bagging film, a sheet of silicon rubber, or similar material. The term "tooling" or "tool" refers to a solid entity/surface against which the composite material is molded; it forms the shape of the molded article ("workpiece") as the liquid resin transforms into a solid. The soft tool is sealed to the hard tool or another appropriate surface to create or gas-tight chamber 114. During operation, air is evacuated from chamber 114; for this reason, the membrane is sometimes referred to as a "vacuum bag."

Resin is introduced into chamber 114 to impregnate the reinforcement component, typically fibers/fabric 108 (hereinafter "fiber preform 108"), which is already arranged in that region. Also disposed in chamber 114 are mold release (applied as a liquid or solid) film 104, peel ply 106, resin distribution medium 110, resin distribution line(s) 117, and vacuum distribution line(s) 118. The peel ply and release film provide a releasing interface to make it easier to separate various layers (e.g., resin distribution medium, etc.) from the finished workpiece. Resin distribution medium 110 is an open-structured coarse medium used initially as a vacuum pathway to evacuate air from dry fiber preform prior to resin infusion. As its name implies, resin distribution medium 110 is primarily used to rapidly and evenly distribute resin to fiber preform 108.

Fiber preform 108 is thus sandwiched between hard tool 102 and soft tool 112 in chamber 114. In operation, a vacuum is pulled in chamber 114 via vacuum line 118, thereby drawing soft tool 112 against resin distribution medium 110. The pressure differential across the soft tool (atmospheric pressure on one side, vacuum on the other) results in a compaction pressure that compacts the fiber preform. This is required to obtain a composite with a controlled and desired fiber volume fraction. Resin is introduced through soft tool 112 via one or more resin inlet lines 116. Resin is fed from resin inlet line(s) 116 to resin distribution line(s) 117. The resin distribution line(s) provides a way to distribute resin across resin distribution medium 110. The resin rapidly penetrates along the resin distribution medium, is infused throughout the fiber perform, and is then cured.

In conventional VARTM systems, the resin inlet line(s) 116 and resin distribution line(s) 117 remain filled with resin. The resin in these lines is allowed to cure along with the curing workpiece. Typically, the lines are discarded after the workpiece is removed from the mold and new resin inlet lines and resin distribution lines are installed for each subsequent VARTM molding operation. As such, these lines are effectively single-use lines.

It is time consuming to replace the resin inlet and distribution lines for each molding run. And in applications in which the VARTM process is used repeatedly on the same geometry, replacing the lines seems particularly inefficient and costly.

The prior-art has addressed the problem of single-use resin distribution lines with the development of the temporary or reusable resin distribution line. Several different configurations/approaches for a re-usable resin distribution line have been proposed.

One approach, which is depicted in FIGS. 2A through 2D, is a process called "FASTRAC." Like conventional VARTM, FASTRAC apparatus 200 includes hard tool 202 and soft tool 212, with fiber preform 208 sandwiched therebetween. Primary vacuum line 218 is operable to evacuate air from first gas-tight chamber 214 "under" soft tool 212.

Referring now to FIG. 2A and the "magnified" view of FIG. 2B, unlike a conventional VARTM process, FASTRAC apparatus 200 also includes FASTRAC layer 220. This layer is a semi-rigid support layer that has a plurality of channels 224 formed in surface 222. FASTRAC layer 220 is disposed "outside" of soft tool 212. The FASTRAC layer is sealed to the hard tool or other appropriate surface to create a second gas-tight chamber 226 above soft tool 212. Secondary vacuum line 228 is operable to evacuate air from this second gas-tight region. FASTRAC apparatus 200 thus includes two "vacuum bags"—one created by soft tool 212 and the second via FASTRAC layer 220.

Referring now to FIG. 2C and the "magnified" view of FIG. 2D, in operation, a vacuum is first drawn in second chamber 226. This deforms soft tool 212 into the channels 224 of FASTRAC layer 220. This operation creates channels 230 through which resin flows and distributes across the top of fiber preform 208. After channels 230 are formed, the pressure in first chamber 214 is reduced to evacuate air, as per standard VARTM processing. Atmospheric pressure holds FASTRAC layer 220 against fiber preform 208 while, at the same time, channels 230 maintain their shape due to the semi-rigid FASTRAC layer. Resin is then injected into the first chamber (e.g., via resin inlet line 216). The resin flows according to the geometry of channels 230 in FASTRAC layer 220. After the appropriate amount of resin is injected, vacuum in the second chamber is released such that the second chamber is then under atmospheric pressure. The atmospheric pressure in the second chamber causes channels 230 to collapse, forcing soft tool 212 against fiber preform 208. This forces resin into the fiber preform.

The FASTRAC process therefore avoids the use of conventional single-use resin distribution line(s) as well as resin distribution medium by forming channels 230. But the process is complex; accurate control of the sub-atmospheric pressure levels in first chamber 214 and second chamber 226 is critical and timing issues related to resin injection rates and re-pressurizing the second chamber are also very important.

A second approach to creating a reusable resin distribution line is presented in Publ. Pat. Appl. US 2007/0063393. This reference discloses a VARTM process wherein a flow channel is created on the top face of the fiber preform to accelerate resin flow and reduce resin injection time. According to the reference, the channel is created by lifting the soft tool via a pressure differential.

With reference to FIG. 3, which depicts the apparatus disclosed in US 2007/0063393, apparatus 300 includes hard tool 302 and soft tool 312, with fiber preform 308 disposed therebetween. Primary vacuum line 318 is operable to evacuate air from fiber perform 308 "under" soft tool 312. Unique to this process, hard shell 320 is disposed over soft tool 312. Secondary vacuum line 328 is capable of drawing a vacuum in region 326 between shell 320 and soft tool 312. Resin inlet line 316 delivers resin to high permeability channel 332.

In operation, pressure is reduced beneath soft tool 312 via primary vacuum line 318. This draws the soft tool against fiber preform 308, which compacts the fiber preform. While the region beneath soft tool 312 is maintained under reduced pressure, region 326 above the soft tool is reduced to an even lower pressure via secondary vacuum line 328. This causes soft tool 312 to stretch away from the top of fiber preform 308 creating flow channel 314, as depicted in FIG. 3.

Resin is delivered, through resin inlet line(s) 316, to high-permeability region 332. Resin preferentially flows from the high-permeabilty region to flow channel 314 since fiber preform 308 presents a much greater resistance to flow. After the requisite amount of resin is delivered to flow channel 314, region 326 above soft tool 312 is pressurized to atmospheric pressure. The positive pressure in region 326 compresses soft tool 312 against fiber preform 308, which drives the resin into the fiber preform.

The process and apparatus disclosed in US 2007/0063393 avoids the use of conventional single-use resin distribution line(s) and resin distribution medium by forming flow channel 314. The approach taken is, however, quite problematic in terms of workpiece quality (freedom from voids and dry spots), fiber volume fraction, and complexity. As to workpiece quality, the vacuum above soft tool 312 must be stronger than the vacuum under the soft tool (to lift the soft tool to create the flow channel). Since, by definition, a vacuum greater than 1 atmosphere cannot be created, there will necessarily be some partial pressure of air beneath the soft tool in fiber preform 308. For VARTM, the highest workpiece quality (i.e., lowest void content) results when using the highest vacuum possible within the fiber preform. This leaves a minimum amount of residual air in the fiber preform. Residual air can, especially if trapped by complex geometry, lead to voids in the finished part. In extreme cases, the residual air can collect in "dead regions" (regions unconnected to the vacuum port), which can result in "dry" (resin-less) regions in the fiber preform.

US 2007/0063393 even discloses that the fiber volume fraction will be low because of the lack of compaction on the fiber preform. Some mitigation measures are discussed, but ultimately, fiber volume fraction may, in many cases, be lower than desired. Furthermore, the shell (i.e., FIG. 3: shell 320) that is required must support internal vacuum; in other words, a net external pressure of about 14.7 psi. When manufacturing large composite parts, this pressure-supporting shell will necessarily be quite massive and expensive. And, for complex-shaped parts, forming the shell, especially a large one, can be very difficult.

The art would therefore benefit from a molding process that addresses the problem of single-use resin distribution lines but avoids the drawbacks of the solutions heretofore presented.

SUMMARY OF THE INVENTION

The present invention provides a reusable resin distribution line ("RRDL") that avoids many of the drawbacks of the prior art.

A conventional VARTM-based molding apparatus typically includes a soft tool that is coupled to a hard tool, as previously discussed. A fiber preform, which is to be infused with resin to form a composite, is disposed on a first side of the soft tool, between the soft tool and the hard tool. A VARTM-based molding apparatus in accordance with the illustrative embodiment of the present invention also includes an arrangement for forming a RRDL (hereinafter referred to as the "RRDL forming arrangement"). In the illustrative embodiment, the RRDL forming arrangement is disposed on the second side of the soft tool. The RRDL forming arrangement includes two spaced-apart inflatable bladders and a material (hereinafter a "bridge") that spans the two bladders, bridging the space therebetweeen. The soft tool is coupled to the bridge. A resin inlet conduit penetrates the bridge and soft tool at one location so that resin can be delivered to the fiber preform.

In operation, a vacuum is established in the region between the soft tool and the hard tool. This draws the soft tool against the resin distribution medium/fiber preform that is disposed in that region. The second side of the soft tool is exposed to at least atmospheric pressure. This pressure differential—atmospheric or greater pressure on the second side of the soft tool and vacuum on the first side of the soft tool results in a compaction pressure that acts on the fiber preform. To facilitate delivery of the resin to the fiber preform, a passage—the reusable resin distribution line—is formed between the soft tool and the resin distribution medium/fiber preform.

To form the RRDL, the inflatable bladders of the RRDL forming arrangement are inflated. Since the bridge overlies the bladders, it moves away from the resin distribution medium/fiber preform as the bladders inflate. Since the soft tool is coupled to the bridge, it is pulled away from the resin distribution media/fiber perform with the bridge in the region between the two bladders. A passage—the RRDL—results. Resin is delivered from the resin inlet line to the RRDL. Once inside the RRDL, the resin readily travels down the length of the RRDL, permeates the resin distribution medium, and then infuses throughout the fiber preform.

After the requisite amount of resin has been delivered, the bladders are deflated to collapse the RRDL. Since atmospheric or greater pressure remains on the second side of the soft tool, and the first side of the soft tool is under vacuum, any resin that remained in the RRDL just prior to collapse is forced into the resin distribution media and the fiber preform. After collapse, no trace of the RRDL remains.

The resin is then cured, the resin inlet removed, and then the RRDL forming arrangement and soft tool are separated from the cured material.

Some embodiments of the invention provide a resin transfer molding method wherein resin is infused into a fiber preform, wherein the operation of infusing the resin comprises: (a) forming a reusable resin distribution line by inflating two spaced apart bladders, wherein, when inflated, a passage is formed therebetween; and (b) flowing the resin into the passage for infusion into the fiber perform.

Some further embodiments of the invention provide a resin transfer molding method comprising infusing a resin into a fiber preform, wherein the operation of infusing the resin further comprises: (a) establishing and maintaining a pressure less than atmospheric pressure on a first side of a soft tool; (b) establishing and maintaining a pressure that is no less than atmospheric pressure on a second side of the soft tool; (c) forming a temporary passage on the first side of the soft tool that places a source of resin in fluidic communication with the fiber preform; and (d) collapsing the temporary passage after resin is delivered to the fiber preform but before the resin has cured.

In yet some further embodiments, the invention provides a resin transfer molding apparatus, wherein the apparatus comprises:
(1) a molding region, wherein the molding region includes a soft tool and a hard tool;
(2) an arrangement for forming a reusable resin distribution line, wherein the arrangement comprises:
 (a) spaced-apart inflatable bladders; and
 (b) a bridge that overlies the bladders, wherein the soft tool is physically coupled to the bridge; and
(3) a resin inlet, wherein when the bladders are inflated, the resin inlet delivers resin through the bridge and through the soft tool into a passage formed between the soft tool and the workpiece and located within the space between the two bladders.

In some additional embodiments, the invention provides a resin transfer molding apparatus for forming composite articles, wherein the apparatus comprises:
(1) a soft tool; and
(2) an arrangement for forming a reusable resin distribution line, wherein the arrangement comprises:
 (a) spaced-apart inflatable bladders; and
 (b) a bridge that overlies the bladders, wherein the soft tool is physically coupled to the bridge.

BRIEF DESCRIPTION OF THE DRAWINGS

FIGS. 2A-2D depict a first approach in the prior art to providing a reusable resin distribution line in a horizontally oriented VARTM apparatus.

FIG. 5A depicts a side cross-sectional view of a portion a vertically oriented VARTM-based molding apparatus that incorporates an arrangement for forming an RRDL in accordance with the illustrative embodiment of the present invention.

FIG. 5B depicts a perspective view of a bridge element of an arrangement for forming the RRDL of the molding apparatus of FIG. 5A, wherein the bridge element is shown encircling the soft tool of the molding apparatus.

FIG. 6A depicts a sectional view of a portion of the molding region of a vertically oriented VARTM-based molding apparatus, wherein an arrangement for forming a resin flow passage is depicted before the passage is actually formed.

FIG. 6B depicts the portion of the molding region of FIG. 6A wherein inflatable bladders of the arrangement for forming the RRDL are inflated to form the RRDL.

FIG. 6C depicts the portion of the molding region of FIG. 6A wherein resin is introduced to the fiber preform via the RRDL.

FIG. 6D depicts the portion of the molding region of FIG. 6A wherein the resin is fully infused throughout the fiber preform.

FIG. 6E depicts the portion of the molding region of FIG. 6A wherein the resin has cured to form a finished workpiece.

FIG. 6F depicts the portion of the molding region of FIG. 6A wherein the resin inlet line is removed from the apparatus for forming the RRDL.

FIG. 8 depicts a flow diagram of operations and sub-operations of a resin transfer molding method in accordance with the present teachings.

DETAILED DESCRIPTION

Definitions. The terms appearing below are provided with the follow explicit definitions for use in this description and the appended claims.

"Shot" refers to the amount of resin that is required to fill a molding region or mold cavity. A "multi-shot" article requires multiple, sequential resin fills and cures within the mold cavity.

"Workpiece" means the structure that is produced or the assemblage (e.g., core, fiber, resin) that will form that structure in a single shot in the molding region. In the context of multi-shot articles, the workpiece therefore represents a portion or segment of the final composite article (e.g., a segment of the cold water pipe, etc).

"Reinforcement constituent" of a composite material provides certain characteristic properties (usually strength and/or stiffness elated, but also density, electrical resistivity, thermal conductivity, etc.) to the composite. The reinforcement constituent is typically fiber based, such as to produce a fiber-reinforced composite material.

"Fiber preform" refers to an arrangement of fibrous material that is used as the reinforcement constituent. The fibrous material is in a form such as a uni-directional bundle of fibers, plain weave fabric, harness satin fabric, braided fabric, and stitched fabric. Commonly-used fibers include, without limitation, fiber glass, commercially available from Owens Corning Technical fabrics, PPG, AGY and carbon fiber, commercially available from Zoltek and others. In this description and the appended claims, the term "fiber preform" is used as a synonym for the term "reinforcement constituent." As such, the term "fiber preform" will take on an expanded definition consistent with the meaning that one skilled in the art will associate with the term "reinforcement constituent" in the context of a composite material.

"Matrix constituent" of a composite material, which is in liquid form for infusion into the reinforcement constituent, solidifies after curing. The matrix constituent surrounds the reinforcement constitutent, keeping it (e.g., the fibers, fabric, etc.) in a desired location and orientation. It also serves as a load-transfer medium between the reinforcement constituent within the composite. The matrix constituent is typically a resin. The term "resin" is used in this description and the appended claims as a synonym for "matrix constituent." As such, the term "resin" will take on an expanded definition consistent with the meaning that one skilled in the art will associate with the term "matrix constituent" in the context of a composite material.

The present invention provides a reusable resin distribution line (RRDL) that is particularly useful in conjunction with vacuum-assisted resin transfer molding ("VARTM") processes.

Figure 1:
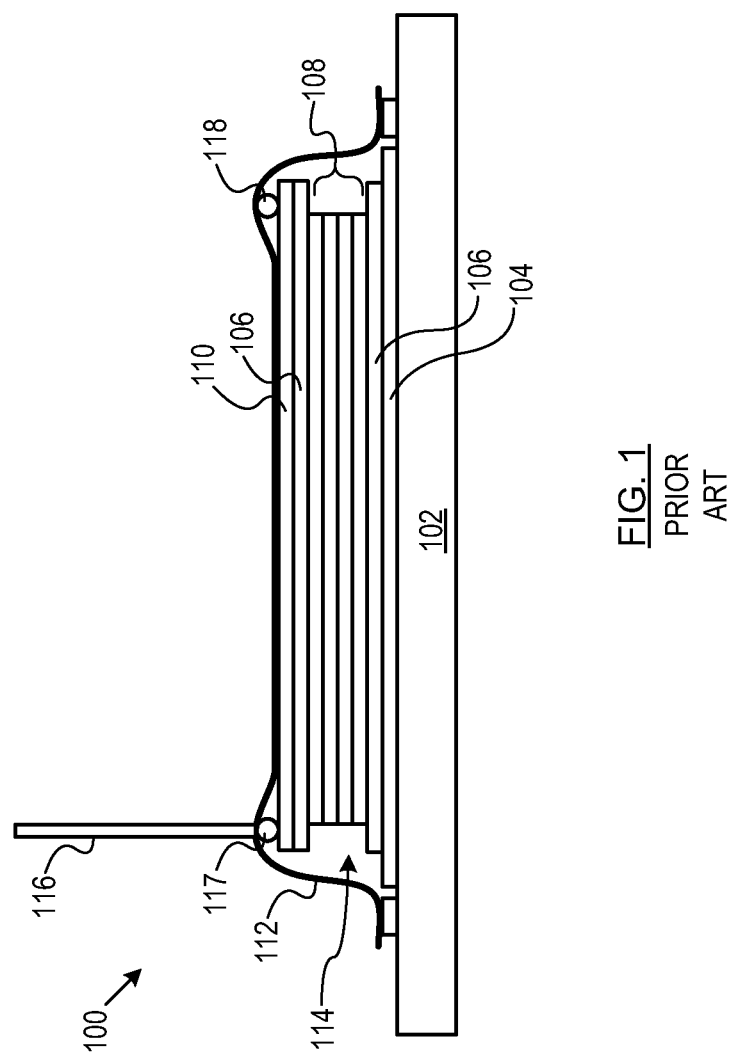
FIG. 1 depicts a side cross section of a conventional, horizontally oriented VARTM apparatus.
Figure 3:
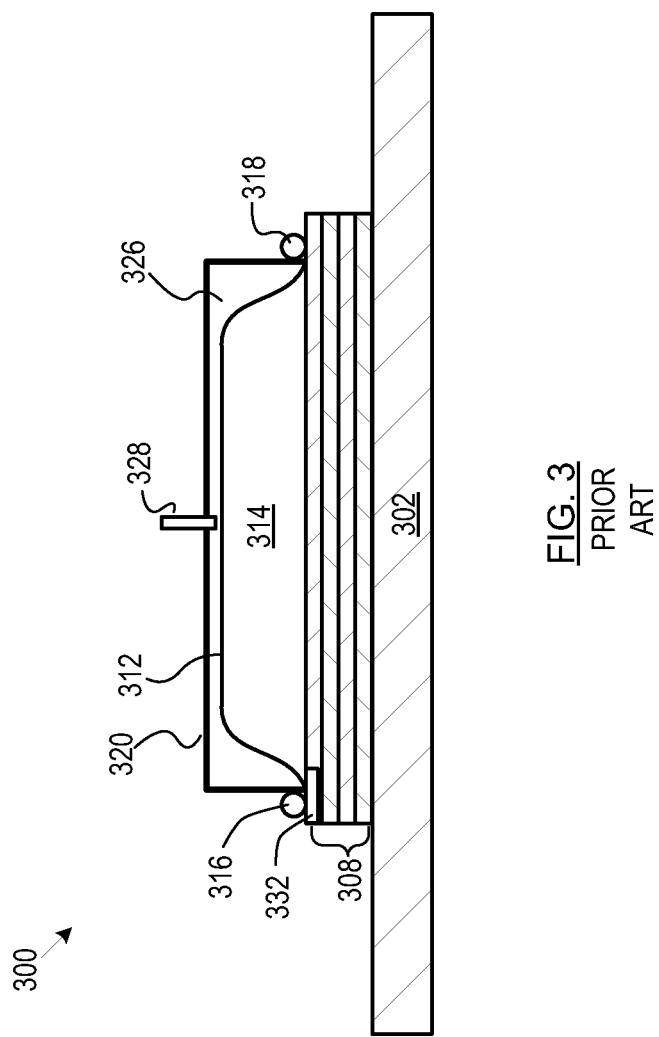
FIG. 3 depicts a second approach in the prior art to providing a reusable resin distribution line for use in a horizontally oriented VARTM process.
Figure 4:
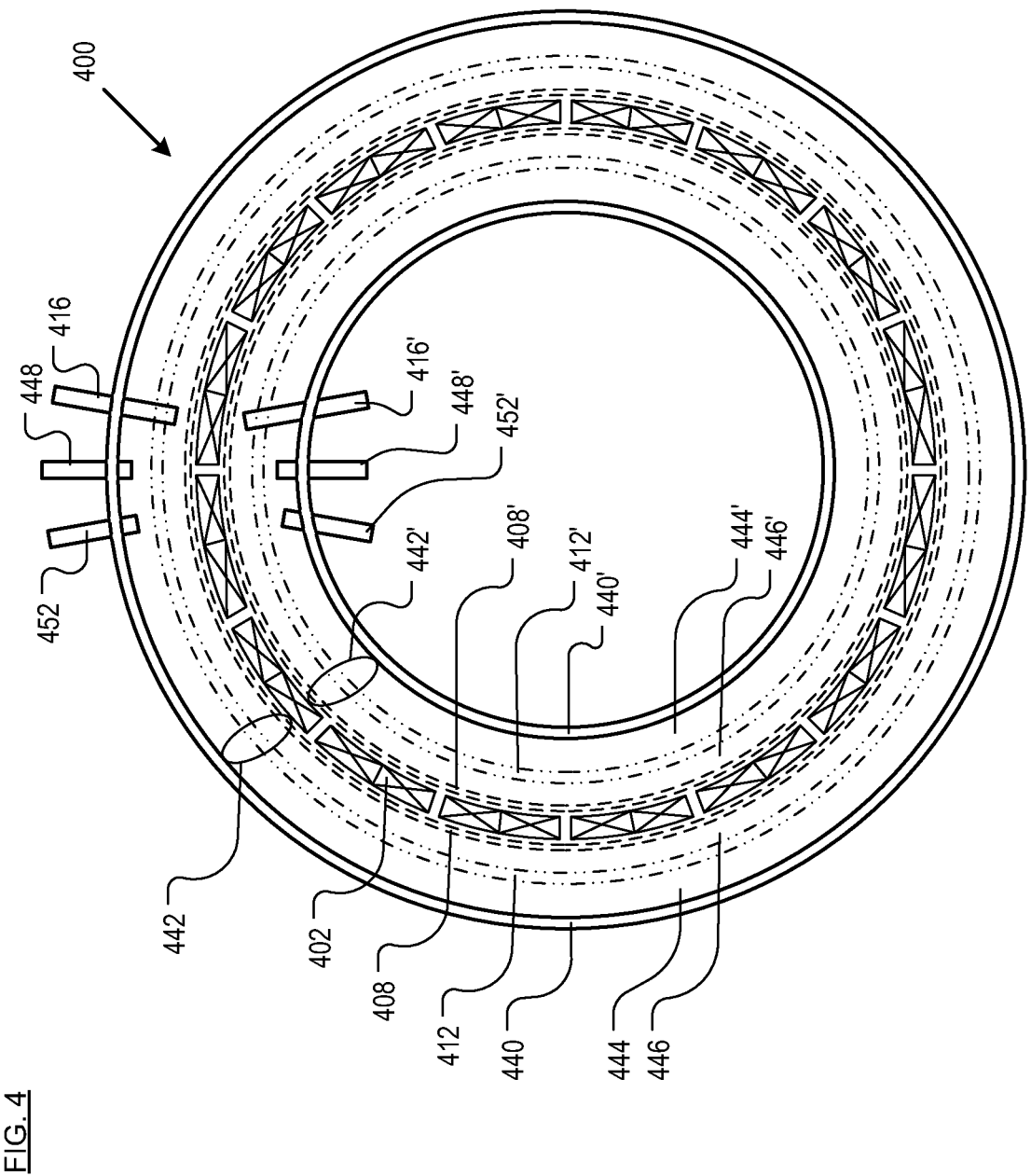
FIG. 4 depicts a top cross-sectional view of the vertically oriented VARTM-based molding apparatus disclosed in Ser. No. 12/484,779.

In the illustrative embodiment, an arrangement for forming the reusable resin distribution line is "added" to a vertically oriented VARTM-based molding apparatus, such as those disclosed in U.S. patent application Ser. No. 12/484,779. A top cross-sectional view of a molding apparatus disclosed in Ser. No. 12/484,779, identified herein as molding apparatus 400, is depicted in FIG. 4. That apparatus is used to fabricate non-planar composite parts; in particular, it is used to form cylindrical structures for creating long, large-diameter articles. A "modified" version of molding apparatus 400, which includes the arrangement for forming the RRDL, is referenced herein as molding apparatus 500 and is depicted in FIGS. 5A-5C and 6A-6G.

It is to be understood that the reusable distribution line and the arrangement by which it is formed, as disclosed herein, is not limited to use with apparatus 400 or to vertically oriented VARTM-type processes generally. In fact, in some embodiments, such as one depicted in FIG. 7, the arrangement for forming a RRDL that is disclosed herein is used in conjunction with a horizontally oriented VARTM-based molding apparatus. Thus, the present invention provides a reusable resin distribution line that can be used in conjunction with virtually any VARTM-based apparatus without regard to whether it is vertically or horizontally oriented and without regard to the particular form/shape of the workpiece produced thereby.

To provide background for the description of the illustrative embodiment of the present invention—molding apparatus 500—a description of molding apparatus 400 and its operation is first provided. FIG. 4 depicts a top cross-sectional view of apparatus 400 through the molding region thereof.

Apparatus 400 includes a molding region that is defined between hard outer wall 440 and hard inner wall 440'. The molding region can be viewed as having two sub-regions: outer molding region 442 and inner molding region 442'. Outer molding region 442 is defined between hard outer wall 440 and a first surface of hard tool or mold 402. Inner molding region 442' is defined between hard inner wall 440' and a second surface of hard tool 402. In apparatus 400, hard tool 402 comprises a plurality of arcuate segments that collectively define a cylindrical shape.

The outer and inner molding regions are identical except for the relatively reduced diameter of inner molding region 442' and the fact that they are "mirror" images of one another. Outer soft tool 412 is disposed within outer molding region 442 and inner soft tool 412' is disposed within inner molding region 442'. Both the inner and outer soft tools are made of a resilient material, such as silicone rubber or the like, which stretches to fit the workpiece and releases easily from cured composite articles (i.e., a finished workpiece).

Region 444 is defined between hard outer wall 440 and outer soft tool 412. Region 444 is referred to herein as being "behind" the outer soft tool. Region 446 is defined between outer soft tool 412 and hard tool 402. Region 446 is referred to herein as being "in front of" outer soft tool 412.

Likewise, region 444' is defined between hard inner wall 440' and inner soft tool 412'. And region 446' is defined between inner soft tool 412' and hard tool 402. Region 444' is referred to herein as being "behind" inner soft tool 412' and region 446' is referred to herein as being "in front of" the inner soft tool. Regions 444 and 444' behind the soft tools are fluidically isolated (i.e., they are gas tight and liquid tight) from respective regions 446 and 446' in front of the soft tools.

Fiber preform 408 is disposed proximal to hard tool 402 within outer molding region 442. Likewise, fiber preform 408' is disposed within inner molding region 442' proximal to hard tool 402.

Molding apparatus 400 also includes liquid supply conduits 448 and 448', resin supply conduits 416 and 416', and gas conduits 452 and 452'. Additionally, molding apparatus 400 includes vacuum conduits, which are not depicted in FIG. 4.

The operation of molding apparatus 400 is described below. For brevity, the details of the operation are only provided with respect to outer molding region 442. It is to be understood, however, that the same operations are occurring in both the outer and inner molding regions.

In molding apparatus 400, hard tool 402 becomes part of the finished workpiece; that is, it forms the core of each cylindrical section formed via apparatus 400. As such, each molding run begins by disposing, in the molding region, the arcuate segments that collectively form cylindrical hard tool 402 as well as the fabric preform that has been applied to the hard tool.

To facilitate this operation, vacuum is pulled in region 444 behind the soft tool so that the soft tool is drawn away from hard tool 402 (i.e., drawn radially outward in molding region 442) to permit the hard tool and fabric preform 408 to drop into place within the molding region. Vacuum can be drawn via gas conduit 452 or via a separate vacuum line (not depicted). A resin distribution media (not depicted) is disposed, along with the fabric, in the molding region. The resin distribution media is positioned between soft tool 412 and fiber preform 408 to facilitate quick spreading of the resin over the full extent of the fiber preform. An example of a suitable resin distribution media is EnkaFusion® brand flow medium available from Colbond-USA, of Enka, N.C.

The vacuum is broken in region 444 and then air is then evacuated from region 446 in front of soft tool 412 via a vacuum line (not depicted). Evacuation of the air reduces, to the extent possible, the void content of the resulting workpiece.

After evacuating air, fabric preform 408 (and the resin distribution media) in the molding region are compacted against hard tool 402. The purpose of this compaction operation is to produce a composite with a controlled and desired fiber volume fraction. Compaction is accomplished by exerting pressure behind soft tool 412. In the illustrative embodiment, the pressure is exerted by introducing liquid into region 444 behind the soft tool. In the illustrative embodiment, liquid is delivered through liquid supply conduit 448. In some embodiments, the liquid is exposed to additional pressurization, such as exposure to the atmosphere or pressurized gas.

In some other less-preferred embodiments, rather than using a liquid, a pressurized gas can be supplied, via gas conduit 452, to region 444. If a pressurized gas is used, there will not be a pressure gradient (since there is no liquid head) in the region behind the soft tool. As such, compaction pressure will not be uniform from the top to the bottom of the molding region. See, e.g., U.S. patent application Ser. No. 12/951,239, incorporated by reference herein.

Resin is introduced along the bottom of the molding region into region 446 via resin supply conduit 416. Typically, a metering-mixing pump (not depicted) that combines catalyst (for curing) and resin in correct proportion supplies the resin to the resin supply conduit. A variety of resins can be used in conjunction with the present invention; commonly used low-viscosity resins suitable for VARTM-type processes include, for example, polyester, vinyl ester, epoxy, phenolic, polyimide, and polyamide. Those skilled in the art will know how to suitably select a resin as a function of the article that is being produced.

With pressure still being exerted behind soft tool 412 and with region 446 remaining under vacuum, the resin infuses fiber preform 408, rising toward the top of the molding region. The amount of resin introduced into the molding region is controlled so that the flow front (i.e., the upper resin level in the fabric preform) stops at or below the level of the liquid behind the soft tool so that the resin remains in a region where compaction pressure is being applied. In this manner, geometry of the workpiece being formed is controlled everywhere within the molding region.

In preferred embodiments, the compacting liquid is selected so that its specific gravity is as close as possible to that of the resin. For example, if the vinyl ester resin Derakane® 8084, which is commercially available from Ashland Inc. of Covington, Ky., is selected for use as the resin, then the compacting liquid can be a 6% sugar/water solution, which has a specific gravity nearly identical to that resin. By selecting the compacting liquid such that is has a specific gravity that is about the same as that of the liquid resin, a uniform compaction pressure can be maintained against the resin-infused fiber preform 408 at all elevations. See, e.g., U.S. patent application Ser. No. 12/951,239.

The resin is then cured (e.g., via the catalyst/time/heat). Compaction pressure is maintained in region 444 behind the soft tool while the resin cures.

After the resin cures to a self-supporting solid, the pressure in region 444 is released. Soft tool 412 is pulled away from the workpiece by applying vacuum to region 444 behind the soft tool. In some embodiments, either before or after the soft tool is released, the workpiece is "post cured." If post curing is performed before release of the soft tool, it is typically performed by heating and circulating the same liquid that is used to pressurize region 444. If post curing is performed after release of the soft tool, it is typically accomplished by circulating hot air between the workpiece and soft tool 412.

After the workpiece is fully cured, it is removed from the molding region. If the article being produced is a multi-shot article, such that the workpiece produced is one of many segments in the final article, then, assuming that more segments are required, the process is repeated by disposing more segments (i.e., hard tool 402) and more fabric into the molding region to fabricate another workpiece. It is notable that in embodiments wherein "continuity of fiber" is maintained, such as those disclosed in U.S. patent application Ser. No. 12/484,779, the reinforcement constituent is "automatically" pulled into the molding region when a workpiece is lowered from the apparatus.

Illustrative Embodiment of the Present Invention. FIG. 5A depicts a side cross-sectional view of a portion of molding apparatus 500 in accordance with the illustrative embodiment of the present invention. Molding apparatus 500 is identical in structure to molding apparatus 400 with the exception that molding apparatus 500 also includes arrangement 560 for forming reusable resin distribution line 570 (hereinafter "RRDL-forming arrangement 560"). The portion of molding apparatus 500 depicted in FIG. 5A corresponds to outer molding region 442 of molding apparatus 400 of FIG. 4. The molding region of apparatus 500 is delimited by notional seals 550 and 552.

Referring now to FIG. 5A, RRDL-forming arrangement 560 includes spaced apart inflatable bladders 562A and 562B as well as bridge 564 that overlies the bladders. Soft tool 512 is coupled (e.g., via adhesive, etc.) to bridge 564. Resin inlet line 516 penetrates bridge 564 and soft tool 512 at one location.

FIG. 5A depicts the bladders fully inflated, such that reusable resin distribution line ("RRDL") 570 is formed. Resin is introduced via resin inlet line 516, as facilitated via RRDL 570, to region 546 between soft tool 512 and hard tool 502. Liquid for providing compaction pressure is delivered to region 544 via liquid inlet line 548. For clarity, the separation between soft tool 512 and fiber preform 508 is exaggerated in FIG. 5A. The soft tool actually abuts the resin distribution media (not shown)/fiber preform during molding operations since a vacuum is drawn in region 546. The only location at which there is any appreciable gap (about 0.5 to 1.0 inches) between the soft tool and the resin distribution media/fiber preform is within RRDL 570.

FIG. 5B, which omits the soft tool and fiber preform to better illustrate features germane to the invention, shows bridge 564 of RRDL-forming apparatus 560 encircling the hard tool 502. Resin inlet 566 penetrates bridge 564 and soft tool 512 so that resin inlet line 516, when coupled to resin inlet 566, can provide resin to RRDL 570.

Figure 5C:
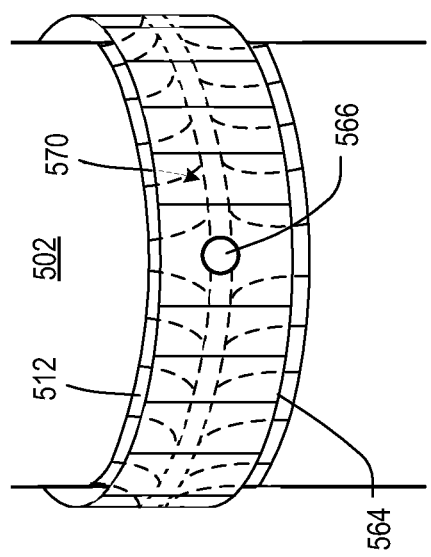
FIG. 5C depicts additional details of the arrangement for forming the RRDL and depicts the RRDL formed thereby.
Figure 5D:
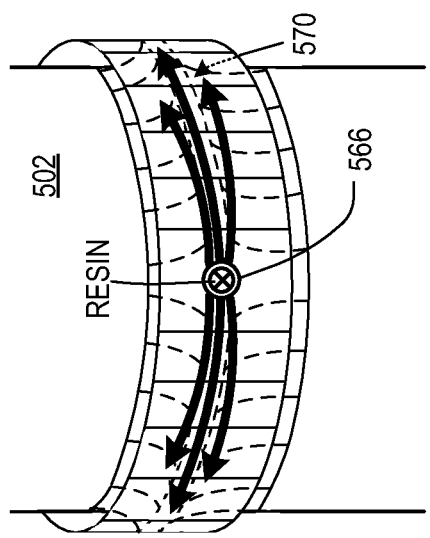
FIG. 5D depicts resin flowing through the RRDL.

FIG. 5C, which also provides limited detail, depicts RRDL 570, which is the passage that results as soft tool 512 (only a section of which is shown) is pulled away from the resin distribution media/fiber preform (not depicted in FIG. 5C). This "pulling" results as bladders 562A and 562B (not depicted in FIG. 5C) are inflated, which causes bridge 564 to move away from the resin distribution media/fiber preform, pulling the soft tool. FIG. 5D depicts resin (solid arrows), after introduction through resin inlet 566, flowing around the circumference of hard tool 502 through RRDL 570.

When bridge 564 is in the form of a closed loop, such as in molding apparatus 500 wherein the bridge encircles hard tool 502, the bridge must be configured so that it can expand and contract in diameter/circumference. That is, it must permit in-plane movement along the length of the bridge. It must do so to account for the change in diameter/circumference of bridge 564 that occurs due to the inflation of bladders 562A and 562B. Also, changes in diameter/circumference of bridge 564 will occur as resin infuses the fiber preform. Notwithstanding the requirement to enable in-plane movement, the bridge must be rigid enough to resist or limit "out-of-plane" movement such that it does not flex towards the resin distribution media as it pulls the soft tool away therefrom. It will be appreciated that some small amount of flexion can be accepted as long as an acceptable-size gap (i.e., at least about 10 millimeters) is maintained "underneath" the bridge between the soft tool and the resin distribution media.

In the illustrative embodiment, bridge 564 comprises a plurality of individual rigid segments 568. The segments are formed of any relatively strong and stiff material, such as, without limitation, aluminum alloy. In the illustrative embodiment, each segment 568 is bonded to the bladders 562A and 562B. The discrete segments 568 are free to move in-plane with respect to one another, as is required to accommodate expansion and contraction, as discussed above. In some other embodiments, the segments are coupled to one another by an elastic and resilient material, wherein the material enables the segments to move in-plane with respect to one another. The rigidity of the individual segments resists out-of-plane movement. Any arrangement that enables in-plane longitudinal movement but resists out-of-plane movement, as discussed above, may suitably be used. But any such arrangement must ensure that soft tool 512 remains coupled to the bridge during expansion and contraction.

In the illustrative embodiment, inflatable bladders 562A and 562B are discrete features, distinct from soft tool 512. In some alternative embodiments, the bladders are integrated into the soft tool itself. It also to be understood that although a single RRDL forming arrangement is depicted in the illustrative embodiment, multiple such arrangements for forming multiple RRDLs can be employed.

The operation of apparatus 500 is essentially the same as that of apparatus 400, with the exception of operations related to the formation and collapse of RRDL 570, which are discussed below in conjunction with FIGS. 6A-6H.

FIGS. 6A-6G depict various operations in the performance of method 800, depicted in FIG. 8. FIGS. 6A-6G depict an enlarged view of the lower portion of the molding region of molding apparatus 500 depicted in FIG. 5A. Features depicted in FIGS. 6A-6G include, primarily: hard wall 540, resin inlet line 516, core material or hard tools 502$_1$ and 502$_2$, soft tool 512, resin distribution medium 610, fiber preform 508, lower seal 550, and RRDL forming apparatus 560, which comprises bridge 564, inflatable bladders 562A and 562B, and inflation tubes 574.

FIG. 6A depicts molding apparatus 500 prior to the formation of the RRDL. Resin distribution medium 610 and fiber preform 508 are under vacuum. Inflatable bladders 562A and 562B, not yet inflated, lie flat between bridge 564 and soft tool 512. Inflation tubes 574 are fluidically coupled to the inflatable bladders to provide compressed gas (e.g., air, etc.) thereto. Liquid, not depicted, has been introduced to region 544 between hard wall 540 and soft tool 512. As discussed in conjunction with apparatus 400, the liquid provides compaction pressure for forcing soft tool 512 against resin distribution media 610 and fiber preform 508. The compaction pressure is resisted by hard tool 502$_2$.

Depicted in the lower half of FIG. 6A, extending below lower seal 550, is finished workpiece 676$_1$. This finished workpiece comprises composite material 678$_1$ and core material (i.e., hard tool 502$_1$) to which the composite material adheres. The composite material is what results after curing the resin from a previous "shot" that infused resin distribution media and a fiber preform that were formerly in the molding region above lower seal 550. As the finished workpiece 676$_1$ is released from the molding region, additional core material and fiber preform are introduced into the molding region. A finished article, which might be a large diameter pipe for example, will consist of many of such cylindrical workpieces. In the illustrative embodiment, the article being formed grows "downward" as each successive workpiece is formed and released from the molding region. This arrangement can be sited, for example, on an offshore platform, which permits the "growing" article to extend downward into the sea. See, e.g., Ser. No. 12/484,779.

Referring now to FIG. 6B, to facilitate the delivery of resin, RRDL 570 is formed by inflating inflatable bladders 562A and 562B. As the bladders inflate by receiving pressurized gas through lines 574, bridge 564 moves radially away from resin distribution medium 610. The bladders must be inflated to a pressure that is greater than the fluid pressure in region 544 at the elevation of the bladders. The bladders should be pressurized to a pressure that is at least about 10 psi greater than the prevailing fluid pressure.

Since soft tool 512 is coupled to bridge 564 between the bladders for the full length of the bridge, the soft tool moves with the bridge away from the resin distribution media. The result is the formation of a passage way—RRDL 570—between soft tool 512 and resin distribution medium 610. It will be appreciated that for molding apparatus 500, which is adapted to form cylindrical-shaped workpieces, an RRDL forming apparatus (and the resulting RRDL) will also be present on the "right" side of hard tool 502. (See, e.g., FIG. 4, which depicts the molding regions on both sides of hard tool 402.)

FIG. 6C depicts the introduction of resin into fiber preform 508. Specifically, resin is introduced through resin inlet line 516 to RRDL 570. Resin flows through the RRDL around the circumference of the nascent workpiece. Resin flows from RRDL 570 to resin distribution medium 610. Since the resistance to flow though the resin distribution media is quite low, the resin rapidly distributes throughout the resin distribution media and then infuses fiber preform 508.

After sufficient resin has been added to fiber preform 508, bladders 562A and 562B are deflated, as depicted in FIG. 6D. As the bladders deflate, RDDL 570 collapses. Liquid remains in region 544 and, as such, the compaction pressure exerted by the liquid against soft tool 512 squeezes any resin that remained in now-collapsing RDDL 570 into the resin distribution media and fiber preform. The resin, fully infused throughout fiber preform 508, and some remaining in resin distribution media 610 and resin inlet line 516, then cures.

FIG. 6E depicts the resin fully cured such that a new workpiece 676$_2$ is formed above workpiece 676$_1$. The new workpiece includes composite material 678$_2$ as well as core material (hard tool) 502$_2$. Composite material 678$_2$ is, of course, what results after the resin that was introduced into resin distribution media 610 and fiber preform 508 cures to a solid.

After liquid is removed from region 544, resin inlet line 516 is removed from resin inlet 566 of RDDL forming arrangement 560, as depicted in FIG. 6F.

Figure 6G:
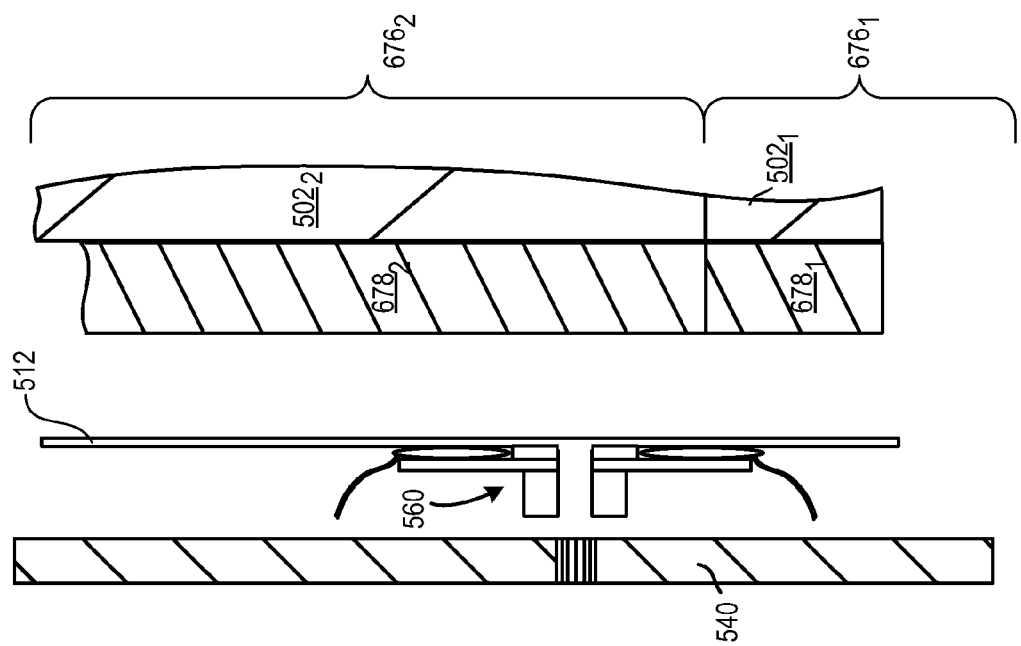
FIG. 6G depicts the portion of the molding region of FIG. 6A wherein the soft tool and the apparatus for forming the RRDL are moved away from the finished workpiece.

FIG. 6G depicts RDDL forming arrangement 560 and soft tool 518 being pulled away from finished workpiece 676$_2$ by applying a weak vacuum within region 544.

Figure 7:
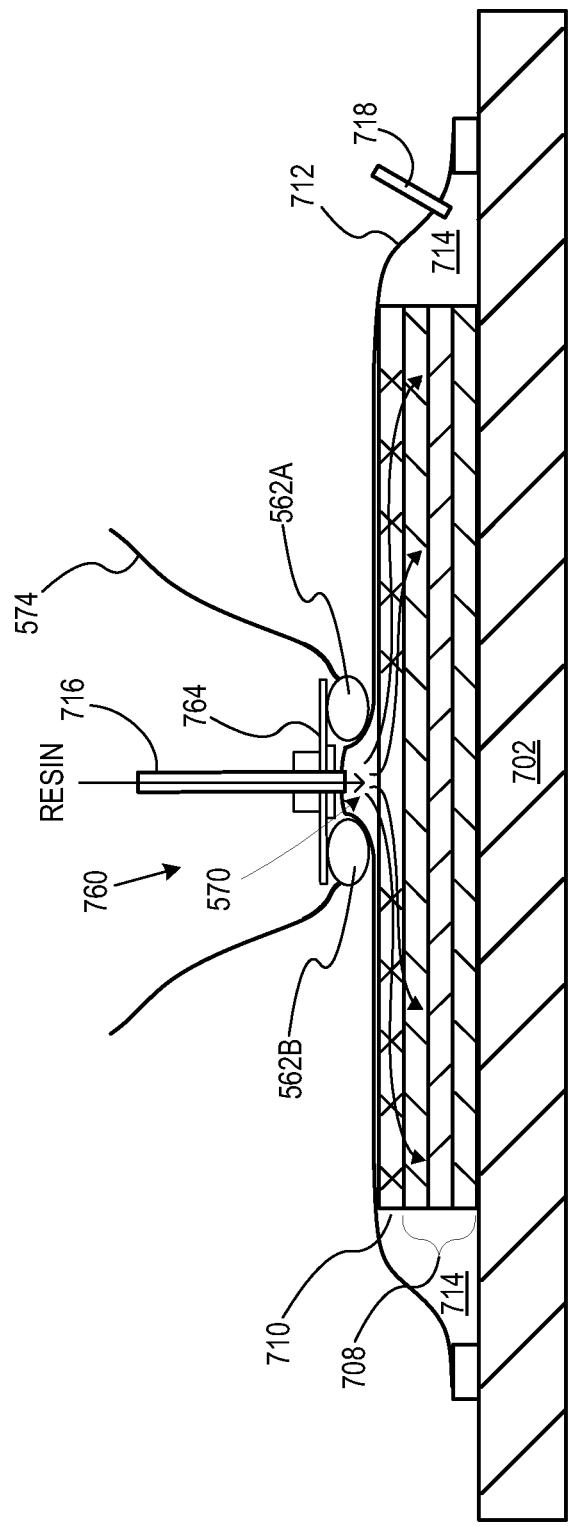
FIG. 7 depicts a cross sectional view of a horizontally oriented VARTM-based molding apparatus that incorporates an arrangement for forming an RRDL in accordance with an alternative embodiment of the present invention.

FIG. 7 depicts horizontally oriented VARTM-based molding apparatus 700, which incorporates an RDDL forming arrangement in accordance with the present invention. As depicted in FIG. 7, apparatus 700 includes hard tool 702 (i.e., the mold), fiber preform 708, resin distribution media 710, soft tool 712, resin inlet line 716, vacuum line 718, and RDDL forming arrangement 760. As in vertically oriented molding apparatus 500, the RDDL forming arrangement includes bridge 764, inflatable bladders 562A and 562B, and inflation lines 574.

Soft tool 712 is sealed to hard tool 702 to create fluid-tight chamber 714. Resin distribution media 710 and fiber preform 708 are disposed within chamber 714 "beneath" soft tool 712.

In operation, vacuum is established in chamber 714 via vacuum line 718, which draws soft tool 712 against resin distribution media 710. The exterior of soft tool 712 is exposed to atmospheric pressure. Compaction of the resin distribution media and fiber preform is provided by the pressure differential across soft tool 712. Inflatable bladders 562A and 562B are inflated to form RDDL 570 in the manner previously described with respect to molding apparatus 500. Resin is introduced into RDDL 570 via resin inlet line 716 and spreads along the length of the RRDL. The resin passes from RDDL 570 to the highly porous resin distribution media 710 and then into fiber preform 708.

Once sufficient resin has been delivered, the bladders are deflated, thereby collapsing RDDL 570. The resin is then cured to form a finished workpiece. After curing, resin inlet line 716 is removed and then RDDL forming arrangement 760 is removed along with the soft tool.

Horizontally oriented VARTM-based molding apparatus 700 is typically used to produce planar workpieces. As such, there will be no need for bridge 764 to be in the form of a closed loop, as was bridge 564 of cylindrical molding apparatus 500. Consequently, unlike its use in apparatus 500, the bridge of RDDL forming arrangement 760 not need to be expandable/collapsible. That is, the bridge does not need to be configured to enable in-plane lengthwise movement thereof. It should, however, resist movement out-of-plane in the manner previously discussed.

By virtue of its horizontal orientation, molding apparatus 700 is readily contrasted with prior-art horizontally oriented VARTM-based molding apparatuses 200 and 300 depicted in FIGS. 2A-2D and 3, respectively.

Both prior art apparatuses establish two sub-atmospheric or vacuum environments; one "underneath" the soft tool and the second "above" the soft tool. In operation of the prior art apparatuses, the vacuum above the soft tool must be greater than the vacuum underneath the soft tool so that the soft tool is pulled away from fiber preform to create what is effectively a reusable resin distribution line. This prevents full vacuum from being applied to the preform prior to infusion of resin. As a consequence, it is unlikely that all residual air trapped in the fabric perform is removed, which air results in voids in the final workpiece. This is very undesirable.

On the other hand, in accordance with embodiments of the present invention, no such second vacuum environment is established. Rather, in accordance with the present teachings, bladders are inflated that, by virtue of the overlying bridge, pull the soft tool away from the resin distribution media and fiber preform. Since only a single vacuum environment is established, the methods disclosed herein are capable of applying full vacuum to the preform prior to infusion of resin. This ensures that substantially all residual air is removed from the perform, and is a significant advantage over the prior art.

FIG. 8 is a flow diagram of a method for resin transfer molding in accordance with the present teachings. The various operations and sub-operations depicted in FIG. 8 mentioned below have been discussed in conjunction with apparatuses 500 and 700. Method 800, depicted in FIG. 8, recites the operations of "infusing a resin into a fiber preform" (operation 802) and "curing the resin" (operation 804).

In some embodiments, operation 802 is implemented via sub-operations 902 and 904, which recite, respectively, "exposing the first side of a soft tool to a pressure below atmospheric pressure" and "forming a reusable resin distribution line while maintaining at least atmospheric pressure on the second side of the soft tool."

In some embodiments, sub-operation 904 is implemented via sub-operations 1002 and 1004, which recite, respectively, "disposing a bridge across two spaced apart bladders" and "inflating the bladders."

In some embodiments, operation 804 of method 800 comprises sub-operation 1102, which recites "deflating the bladders."

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A resin transfer molding apparatus, wherein the apparatus comprises:
   a molding region, wherein the molding region includes a soft tool and a hard tool;
   an arrangement for forming a reusable resin distribution line, wherein the arrangement comprises:
   (a) spaced-apart inflatable bladders;
   (b) a bridge that overlies the bladders, wherein the soft tool is physically coupled to the bridge; and
   a resin inlet, wherein when the bladders are inflated, the resin inlet delivers resin through the bridge and through the soft tool into a passage formed between the soft tool and the hard tool and located within the space between the two bladders.

2. The apparatus of claim 1 wherein soft tool has a first side and a second side, and wherein the inflatable bladders are disposed on the first side of the soft tool and the hard tool is disposed on the second side of the soft tool.

3. The apparatus of claim 1 further comprising a resin inlet line that removably couples to the resin inlet.

4. The apparatus of claim 1 wherein the bridge comprises a plurality of segments.

5. A resin transfer molding apparatus for forming composite articles, wherein the apparatus comprises:
   a soft tool; and
   an arrangement for forming a reusable resin distribution line, wherein the arrangement comprises:
   (b) spaced-apart inflatable bladders; and
   (b) a bridge that overlies the bladders, wherein the soft tool is physically coupled to the bridge.

6. The apparatus of claim 5 further comprising a tube for delivering pressurized air to the bladders.

7. The apparatus of claim 5 wherein the resin transfer molding apparatus is vertically oriented and further comprises:
   a hard tool, wherein the hard tool is disposed radially inward of the soft tool; and
   a resin inlet line, wherein the resin inlet line penetrates the bridge and the soft tool and is in fluid communication with a region between the soft tool and the hard tool to deliver resin thereto when the bladders are inflated.

8. The apparatus of claim 5 wherein the resin transfer molding apparatus is horizontally oriented and further comprises:
   a hard tool, wherein the hard tool is disposed beneath the soft tool; and
   a resin inlet line, wherein the resin inlet line penetrates the bridge and the soft tool and is in fluid communication with a region between the soft tool and the hard tool to deliver resin thereto when the bladders are inflated.

* * * * *